(12) United States Patent
Tseng et al.

(10) Patent No.: US 11,265,677 B2
(45) Date of Patent: Mar. 1, 2022

(54) POWER POSITIONING METHOD AND POWER POSITIONING DEVICE THEREOF

(71) Applicant: GUNITECH CORP., Hsinchu County (TW)

(72) Inventors: Yu-Chee Tseng, Hsinchu County (TW); Ting-Hui Chiang, Hsinchu County (TW); Kai-Cheng Huang, Hsinchu County (TW); Huan-Ruei Shiu, Hsinchu County (TW); Hsin-Yi Kao, Hsinchu County (TW); Chung-Liang Hsu, Hsinchu County (TW)

(73) Assignee: GUNITECH CORP., Hsinchu County (TW)

( * ) Notice: Subject to any disclaimer, the term of this patent is extended or adjusted under 35 U.S.C. 154(b) by 0 days.

(21) Appl. No.: 17/074,915

(22) Filed: Oct. 20, 2020

(65) Prior Publication Data

US 2021/0195369 A1 Jun. 24, 2021

Related U.S. Application Data

(60) Provisional application No. 62/953,248, filed on Dec. 24, 2019.

(51) Int. Cl.
*H04W 4/02* (2018.01)
*H04B 17/318* (2015.01)

(52) U.S. Cl.
CPC .......... *H04W 4/023* (2013.01); *H04B 17/318* (2015.01)

(58) Field of Classification Search
CPC ..... H04W 4/023; H04W 17/318; H04W 4/02; H04B 17/318

USPC ......................................................... 455/456
See application file for complete search history.

(56) References Cited

U.S. PATENT DOCUMENTS

| 10,484,820 | B2 | 11/2019 | Skaaksrud |
| 2004/0203904 | A1 | 10/2004 | Gwon et al. |
| 2007/0258421 | A1* | 11/2007 | Alizadeh-Shabdiz ...... G01S 11/06 370/338 |

(Continued)

FOREIGN PATENT DOCUMENTS

| EP | 2469298 A1 | 6/2012 |
| JP | 2010239331 A | 10/2010 |

(Continued)

*Primary Examiner* — Ted M Wang
(74) *Attorney, Agent, or Firm* — Karin L. Williams; Alan D. Kamrath; Mayer & Williams PC (57) ABSTRACT

A power positioning method and a power positioning device thereof are disclosed. The method comprises the steps of: controlling a device to be measured to transmit a plurality of positioning signals by a plurality of transmission powers; causing a plurality of known location devices to receive the plurality of positioning signals and recording the plurality of positioning signals and a plurality of corresponding receiving time to a database; finding out the known location device with a large signal intensity among the received plurality of positioning signals; taking out a signal intensity-distance function and a signal intensity-distance standard deviation function from the database; and finding out a device location of the device to be measured according to the signal intensity-distance function and the signal intensity-distance standard deviation function.

12 Claims, 8 Drawing Sheets

(56) References Cited

U.S. PATENT DOCUMENTS

| | | | | |
|---|---|---|---|---|
| 2013/0178235 A1* | 7/2013 | Chen | ................... | H04W 64/00 |
| | | | | 455/456.5 |
| 2017/0356979 A1* | 12/2017 | Georgiou | .............. | G01S 5/0215 |
| 2018/0213356 A1 | 7/2018 | Singamsetty et al. | | |
| 2019/0331760 A1 | 10/2019 | Nishimura et al. | | |

FOREIGN PATENT DOCUMENTS

| | | |
|---|---|---|
| TW | 201329485 A | 7/2013 |
| TW | I675215 B | 10/2019 |

* cited by examiner

POWER POSITIONING METHOD AND POWER POSITIONING DEVICE THEREOF

BACKGROUND OF THE INVENTION

1. Field of the Invention

The present invention relates to a power positioning method and a power positioning device thereof, particularly to a power positioning method and a power positioning device thereof using different power signals for positioning.

2. Description of the Related Art

Conventionally, the positioning method for indoor devices often involved trilateral positioning. The distance required for trilateral positioning is usually calculated using signal intensity or time of arrival (ToA). Therefore, the signal intensity or the accuracy of ToA calculation may affect the inferred distance, and then the accuracy of the trilateral positioning. In the prior art, the positioning methods all rely on transmitting signals at the fixed power. With such positioning method, the positioning accuracy is limited by the decline of a single power signal.

Today's mobile devices, like mobile phones, are often equipped with other sensors with different functions. Sensors such as gyroscopes and electronic compasses can assist and improve positioning accuracy. However, in consideration of the device cost, the indoor positioning device may not be equipped with a variety of sensors. Without the assistance of other sensors, indoor positioning can only rely on a signal intensity to estimate a distance and use this data for positioning. However, in the prior art, the signal intensity of Bluetooth devices often varies greatly, resulting in large positioning errors.

Accordingly, it is necessary to provide a new power positioning method and a power positioning device thereof to solve the problem in the prior art.

SUMMARY OF THE INVENTION

It is a major objective of the present invention to provide a power positioning method that can achieve using different power signals for positioning.

It is another objective of the present invention to provide a power positioning device used for the above method.

To achieve the above objectives, a power positioning method in the present invention is used for a power positioning device to find out a device location of a device to be measured in a space. The space includes a plurality of known location devices. The power positioning method includes the steps of: controlling the device to be measured to transmit a plurality of positioning signals by a plurality of transmission powers; causing a plurality of known location devices to receive the plurality of positioning signals, and recording the plurality of positioning signal intensity, a plurality of corresponding receiving time and coordinates of the plurality of known location devices to a database; finding out the known location device with a larger signal intensity among the received plurality of positioning signals; taking out a signal intensity-distance function and a signal intensity-distance standard deviation function from the database; obtaining the plurality of known location devices with the larger signal intensity according to the signal intensity-distance function and the signal intensity-distance standard deviation function; and grouping the plurality of known location devices according to a plurality of power to find out the device location of the device to be measured.

The power positioning device in the present invention includes a processing module, a database, and a calculation module. The processing module controls a device to be measured to transmit a plurality of positioning signals by a plurality of transmission powers, and causing the plurality of known location devices to receive a plurality of positioning signals. The database is electrically connected to the processing module for storing a signal intensity-distance function and a signal intensity-distance standard deviation function, and after the plurality of known location devices receive the plurality of positioning signals, the database records the plurality of positioning signal intensity, a plurality of corresponding receiving time and coordinates of the plurality of known location device, such that the processing module finds out the known location device with a larger signal intensity among the received plurality of positioning signals. The calculation module is electrically connected to the database for finding out the signal intensity-distance function and the signal intensity-distance standard deviation function according to a plurality of positioning signal intensity, a plurality of corresponding receiving time, and a known location device with the larger signal intensity to obtain a plurality of known location devices with the larger signal intensity, and then the calculation module groups the plurality of known location devices according to a plurality of power to find out the device location of the device to be measured.

DETAILED DESCRIPTION OF THE PREFERRED EMBODIMENT

Hereafter, the technical content of the present invention will be better understood with reference to preferred embodiments.

Figure 1:
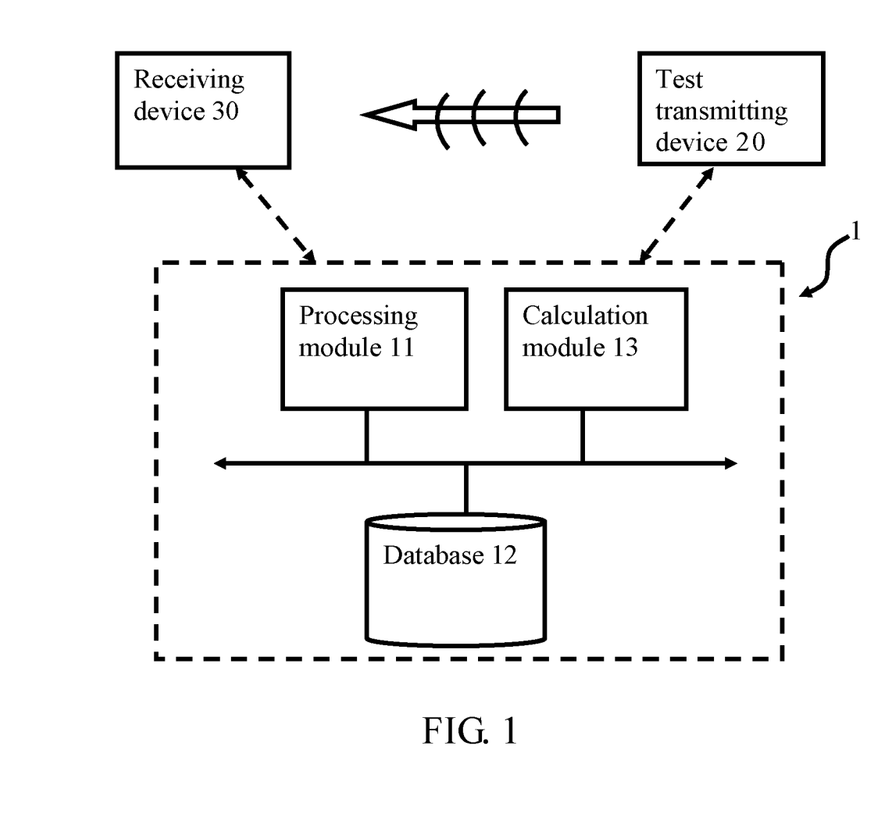
FIG. 1 is a system architecture diagram showing configuration of a power positioning device of the present invention.

Please first refer to FIG. 1 for a system architecture diagram showing configuration of a power positioning device of the present invention.

Figure 3:
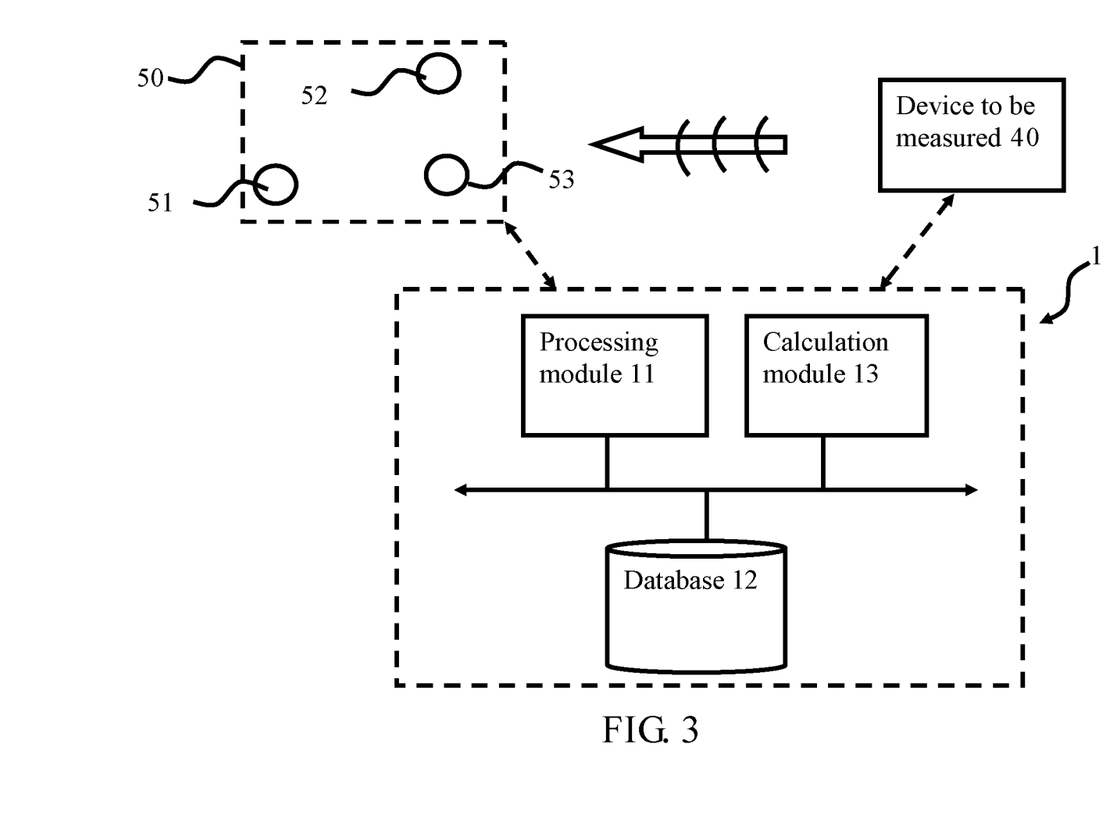
FIG. 3 is a system architecture diagram showing the power positioning device being positioned of the present invention.

In an embodiment of the present invention, a power positioning device 1 includes a processing module 11, a database 12 and a calculation module 13 electrically connected to each other. The power positioning device 1 is used to find a device location of a device to be measured 40 in a space by using a known location device 50 (as shown in FIG. 3). Before finding out the device to be measured 40, the power positioning device 1 can also use a test transmitting device 20 and a receiving device 30 to create the required data, but the present invention is not limited thereto. Specifically, all the test transmitting device 20, receiving device 30, the device to be measured 40 and the known location device 50 can send and receive wireless signals. The wireless signals can be Bluetooth signals, and the test transmitting device 20, the receiving device 30, the device to be measured 40, and the known location device 50 can be the same or different home appliances, computer equipment or mobile devices, etc., but the present invention is not limited thereto.

It should be noted that each module in the power positioning device 1 may be configured as a hardware device, software program in combination with hardware device, or firmware in combination with hardware device. For example, a computer program product may be stored in a computer readable medium and read and executed to achieve the functions of the present invention, and may also be configured in a cloud environment or a virtual server. However, the present invention is not limited in the manner described above. Additionally, the preferred embodiment of the present invention described here is only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules. The processing module 11, database 12 or calculation module 13 can be provided on the same device or separately in different devices, or can be provided in any of the test transmitting device 20, the receiving device 30, the device to be measured 40 or the known location device 50, but the present invention is not limited thereto.

Accordingly, in an embodiment of the present invention, the processing module 11 sets a plurality of transmission powers of the test transmitting device 20, so the test transmitting device 20 can emit a plurality of test signals. Then, the receiving device 30 receives the plurality of test signals at a plurality of corresponding distances from the test transmitting device 20, for example, at a distance of 10 cm, 20 cm, or a distance between 1 m and 6 m, and transmits different test signals with different transmission powers. However, the present invention is not limited to the above values. Accordingly, the processing module 11 detects intensities of a plurality of test signals received by the receiving device 30 and records the intensities of the plurality of test signals and the plurality of corresponding distances to the database 12. Finally, the calculation module 13 calculates the signal intensity-distance function and signal intensity-distance standard deviation function from the numerical calculation of database 12, and stores them in the database 12.

Figure 2:
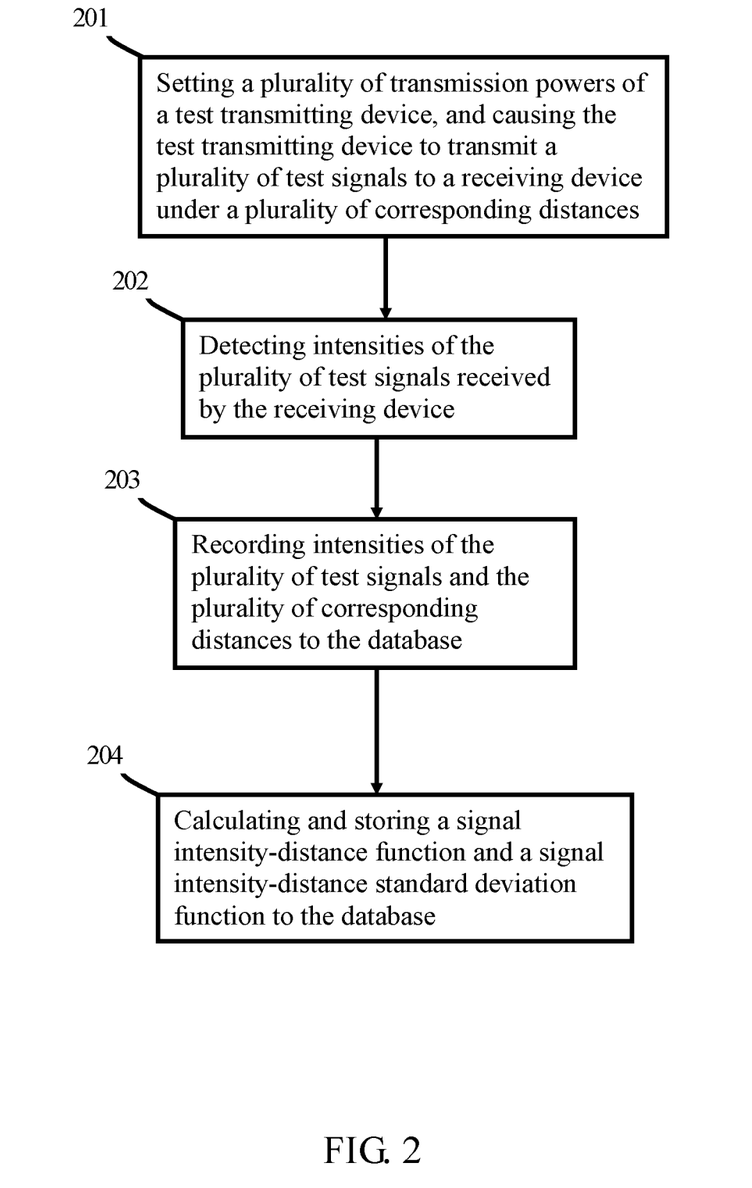
FIG. 2 is a flowchart showing steps of a data setting process of the present invention.

Then, please refer to FIG. 2 for a flowchart showing steps of a data setting process in the present invention. It should be noted here that although the following uses the above power positioning device 1 as an example to illustrate the data setting process of the present invention, the data setting process of the present invention is not limited to the power positioning device 1 used in the same structure described above.

First of all, in Step 201: Setting a plurality of transmission powers of a test transmitting device, and causing the test transmitting device to transmit a plurality of test signals to a receiving device under a plurality of corresponding distances.

First, the processing module 11 sets a plurality of transmission powers of the test transmitting device 20. Therefore, the test transmitting device 20 can emit a plurality of test signals. Then, the receiving device 30 is allowed to receive the plurality of test signals at a plurality of corresponding distances from the test transmitting device 20, for example, at a distance of 10 cm, 20 cm, or a different distance between 1 m and 6 m.

Next, in Step 202: Detecting intensities of the plurality of test signals received by the receiving device.

The processing module 11 detects signal intensities of all signals received by the receiving device 30.

Then, in Step 203: Recording intensities of the plurality of test signals and the plurality of corresponding distances to the database.

The processing module 11 stores the signal intensities of all test signals received by the receiving device 30 and the corresponding distances of the test signals into the database 12.

Finally, in Step 204: Calculating and storing a signal intensity-distance function and a signal intensity-distance standard deviation function to the database.

Finally, according to the signal intensities of all the signals and the corresponding distances of the signals, the calculation module 13 can calculate the signal intensity-distance function and signal intensity-distance standard deviation function for each different transmission power to know the relationship between the signal intensity received by the receiving device 30 and the test transmitting device 20 and the standard deviation. Then, the calculation module 13 can store the functions in the database 12. In this way, the data setting process of the present invention can be completed.

Hereafter, please refer to FIG. 3 for a system architecture diagram of a power positioning device performing positioning of the present invention.

After the signal intensity-distance function and signal intensity-distance standard deviation function are established in the database 12, the power positioning device 1 can use a known location device 50 to find out a device location of the device to be measured 40 in a space. It should be noted that although an embodiment of the present invention uses the method of directly performing the data setting process to get the signal intensity-distance function and signal intensity-distance standard deviation function, the present invention does not limit the data setting process to be performed every time to re-establish the signal intensity-distance function and signal intensity-distance standard deviation function in the database 12. The signal intensity-distance function and signal intensity-distance standard deviation function can be preset to the device to be measured 40 or the known location device 50.

Accordingly, the processing module 11 controls the device to be measured 40 to emit a plurality of positioning signals at a plurality of transmission powers, such that the plurality of known location devices 50 receive the plurality of positioning signals, and record the intensities of the plurality of positioning signals, a plurality of corresponding receiving time and the locations of the plurality of known location devices 50 to the database 12. The plurality of known location devices 50 also receive an identification code of the device to be measured 40, thereby identifying the device to be measured 40. This identification code will also be stored in the database 12. As such, the processing module 11 finds out a device with the larger signal intensity in the received plurality of positioning signals, such as the known location devices 51, 52, 53. Finally, the calculation module 13 can find out the device location of device to be measured 40 according to the signal intensity-distance function and the signal intensity-distance standard deviation function from the locations of the known location devices 51, 52, 53.

Figure 4:
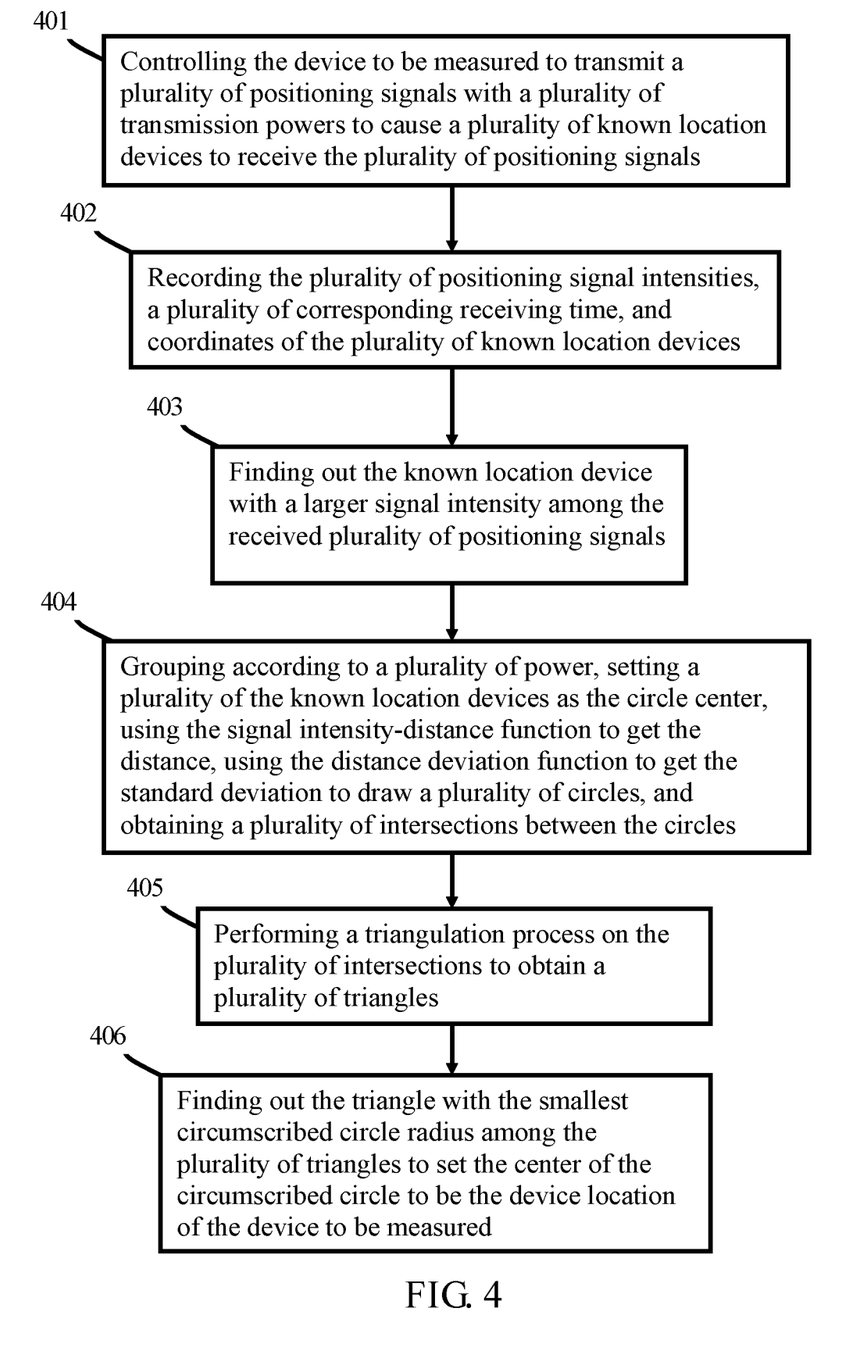
FIG. 4 illustrates a flowchart of the power positioning method of the present invention.

For the detailed method of finding out the device location of device to be measured 40, please refer to FIG. 4 related to a flowchart showing steps of a device positioning process of the present invention.

First of all, in Step 401: Controlling the device to be measured to transmit a plurality of positioning signals with a plurality of transmission powers to cause a plurality of known location devices to receive the plurality of positioning signals.

First, when the device to be measured 40 enters a space, the processing module 11 first controls the device to be measured 40 to transmit positioning signals with different transmission powers. In this way, the different known location device 50 can receive the positioning signal of the device to be measured 40. The plurality of known location devices 50 also receive an identification code of the device to be measured 40.

Next, in Step 402: Recording the plurality of positioning signal intensities, a plurality of corresponding receiving time, and coordinates of the plurality of known location devices.

Since the device to be measured 40 transmits positioning signals with different transmission powers, after the known location device 50 receives the positioning signal, the known location device 50 sends all the positioning signals, the corresponding receiving time and coordinates of the known location device 50 back to the database 12.

Further, in Step 403: Finding out the known location device with a larger signal intensity among the received plurality of positioning signals.

From the data of database 12, the processing module 11 finds out the known location devices 51, 52, 53 in a plurality of positioning signals that have received a larger signal intensity.

Then, in Step 404: Grouping according to a plurality of power, setting a plurality of the known location devices as the circle center, using the signal intensity-distance function to get the distance, using the distance deviation function to get the standard deviation to draw a plurality of circles, and obtaining a plurality of intersections between the circles.

Next, the calculation module 13 can query the signal intensity-distance function and the signal intensity-distance standard deviation function according to the plurality of positioning signal intensity s, the plurality of corresponding receiving time and the known location device with the larger intensity. The known location devices 51, 52, 53 at different powers are grouped, the fixed point coordinates of the known location devices 51, 52, 53 are taken as the center of the circle, and the distance under this signal intensity according to the signal intensity-distance function can be obtained, that is, the distance is set as the base radius. Then, the signal intensity-distance standard deviation function is used to find out the distance standard deviation under the signal intensity, that is, the standard deviation is set as the basis for radius adjustment.

Figure 5A:
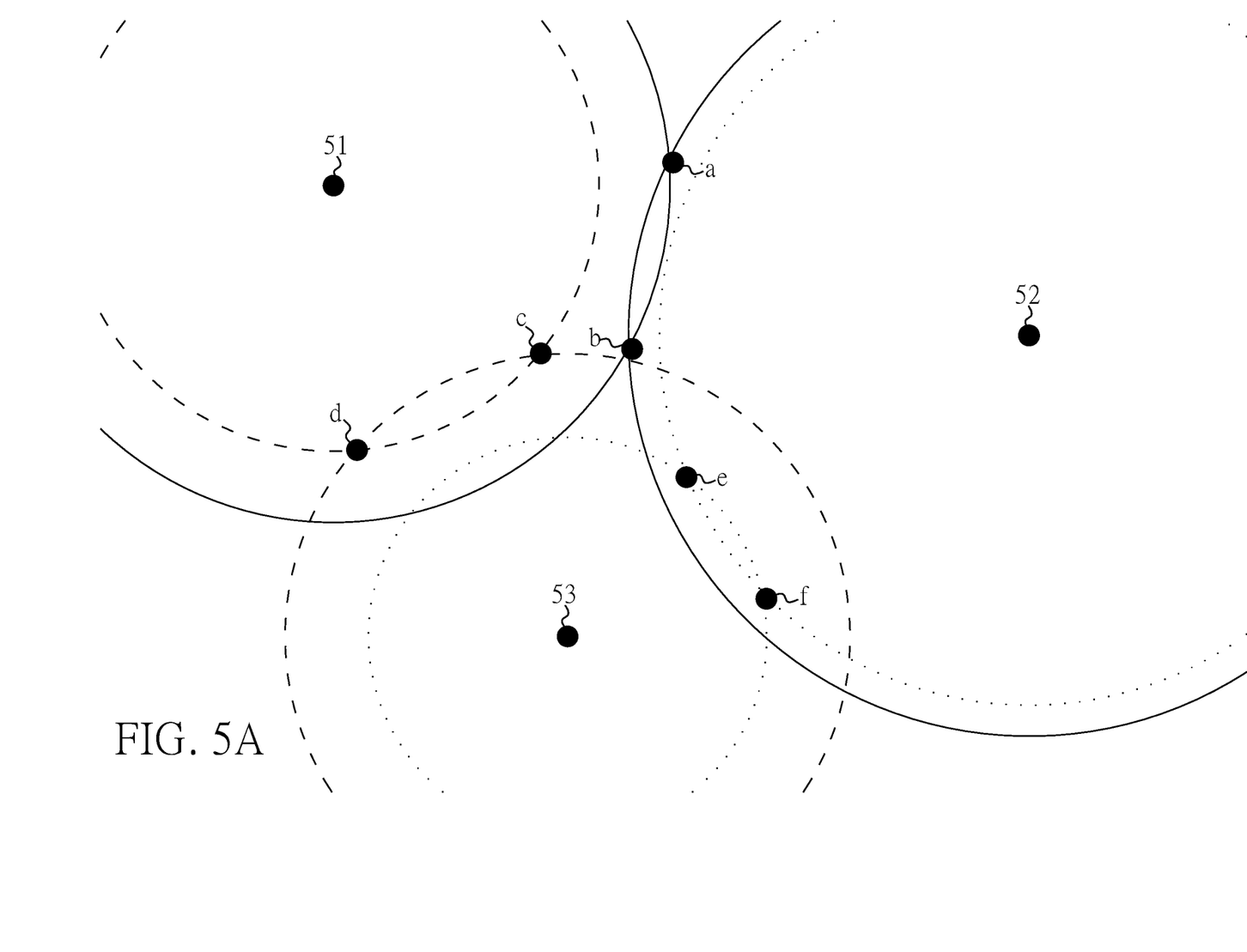
FIGS. 5A-5B are base to FIG. 4 to illustrate schematic diagrams of the concentric circles of the power positioning method under different transmission powers of the present invention.
Figure 5B:
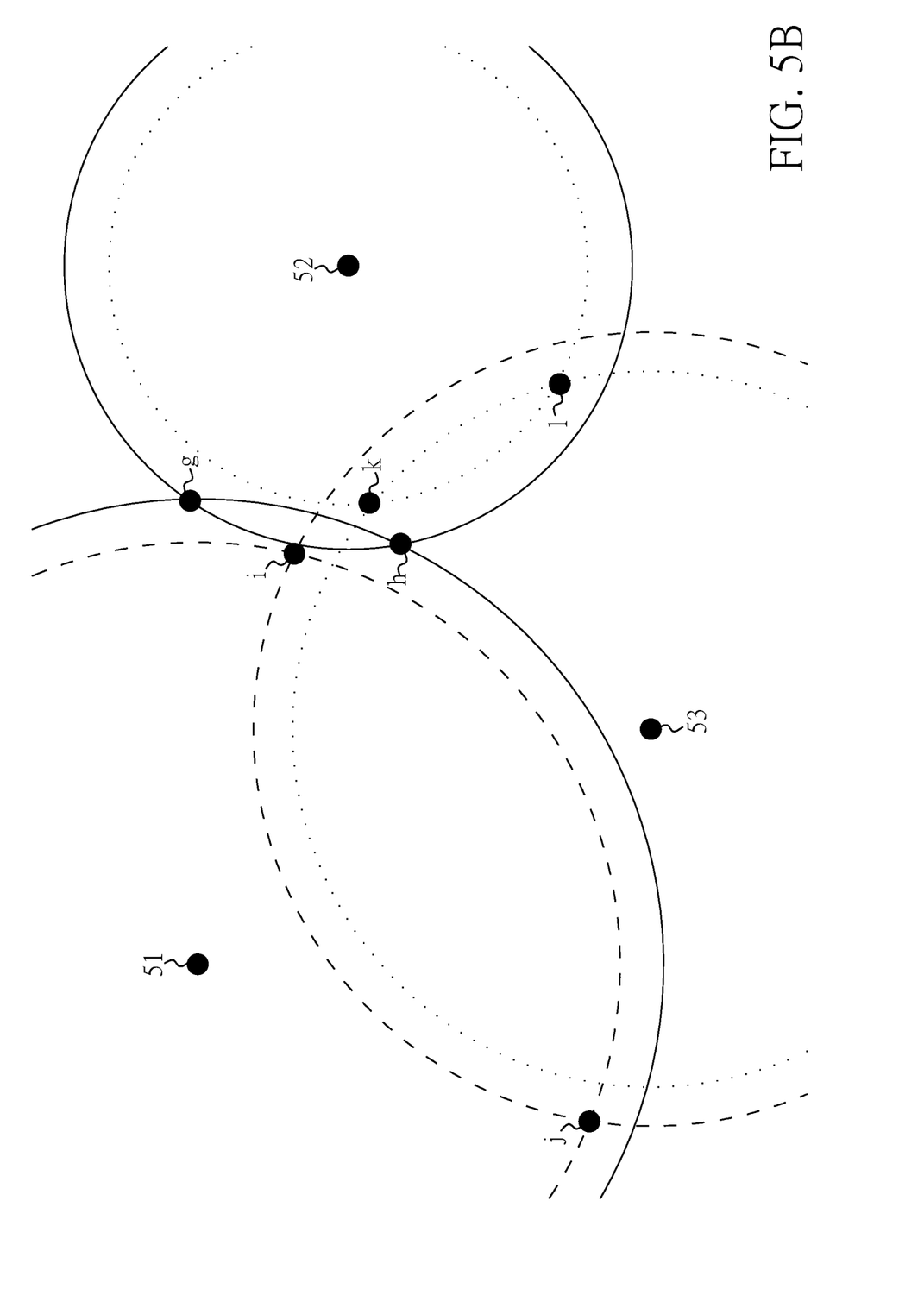

Hereafter, please refer to FIGS. 5A-5B are base to FIG. 4, to illustrate schematic diagrams of the concentric circles of the power positioning method under different transmission powers of the present invention.

Therefore, in the present embodiment, a plurality of circles with the fixed point coordinates of the known location devices 51, 52, 53 are drawn as the center, and the fixed points are used to find out the intersection. In FIG. 5A, the original radius distance minus 0.67 standard deviation is set as the minimum radius, and the original radius distance plus 0.67 standard deviation is set as the maximum radius. If the two circles are tangent or intersect, it can be ended. As such, a plurality of intersections a-f among a plurality of circles can be obtained, that is, the circle of the known location devices 51, 52 has the intersections a, b, the circle of the known location device 51, 53 has the intersections c, d, and the circle of the known location devices 52, 53 has the intersections e, f. In each group of power, a maximum of 6 intersections can be obtained between the circles of known location devices 51, 52, 53, but the present invention is not limited to 6 intersections. FIG. 5B is a schematic diagram of the intersection calculated by known location devices 51, 52, 53 at another power. Accordingly, in FIG. 5B, six intersections g-l of known location device 51, 52, 53 at another power can be obtained.

Next, in Step 405: Performing a triangulation process on the plurality of intersections to obtain a plurality of triangles.

Figure 5C:
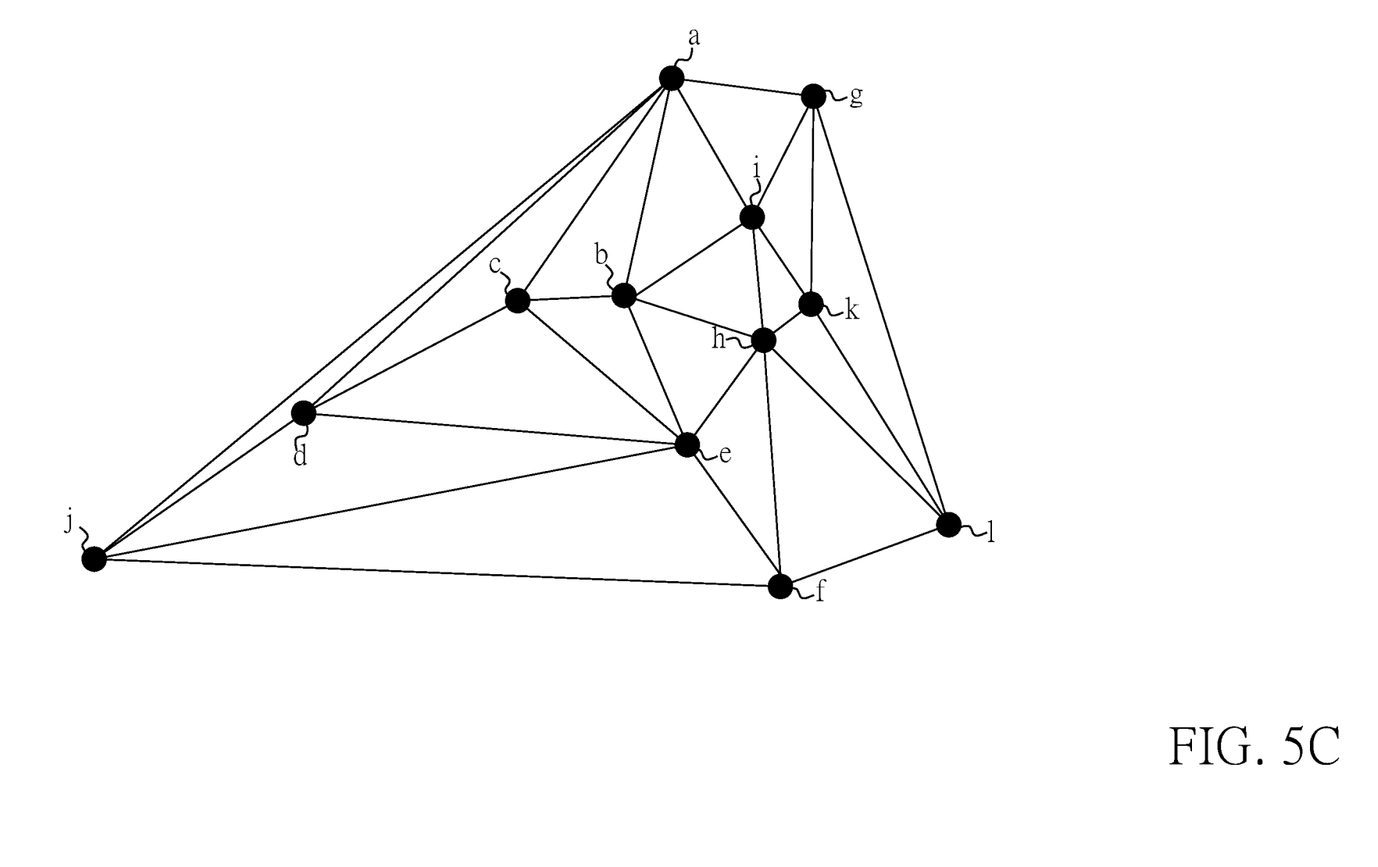
FIG. 5C is base to FIG. 4 to illustrate a schematic diagram of the triangulation process for the intersection of the power positioning method of the present invention.

Hereafter, please refer to FIG. 5C is base to FIG. 4, to illustrate a schematic diagram of the triangulation process for the intersection of the power positioning method of the present invention.

At this time, the calculation module 13 removes outliers of all the intersections a-l and performs a Drouin triangulation process to obtain a plurality of triangles. In this embodiment, 12 intersections a-l obtained from two different powers are used for calculation, but the present invention is not limited thereto. More intersections can get more accurate results.

Finally, in Step 406: Finding out the triangle with the smallest circumscribed circle radius among the plurality of triangles to set the center of the circumscribed circle to be the device location of the device to be measured.

Figure 5D:
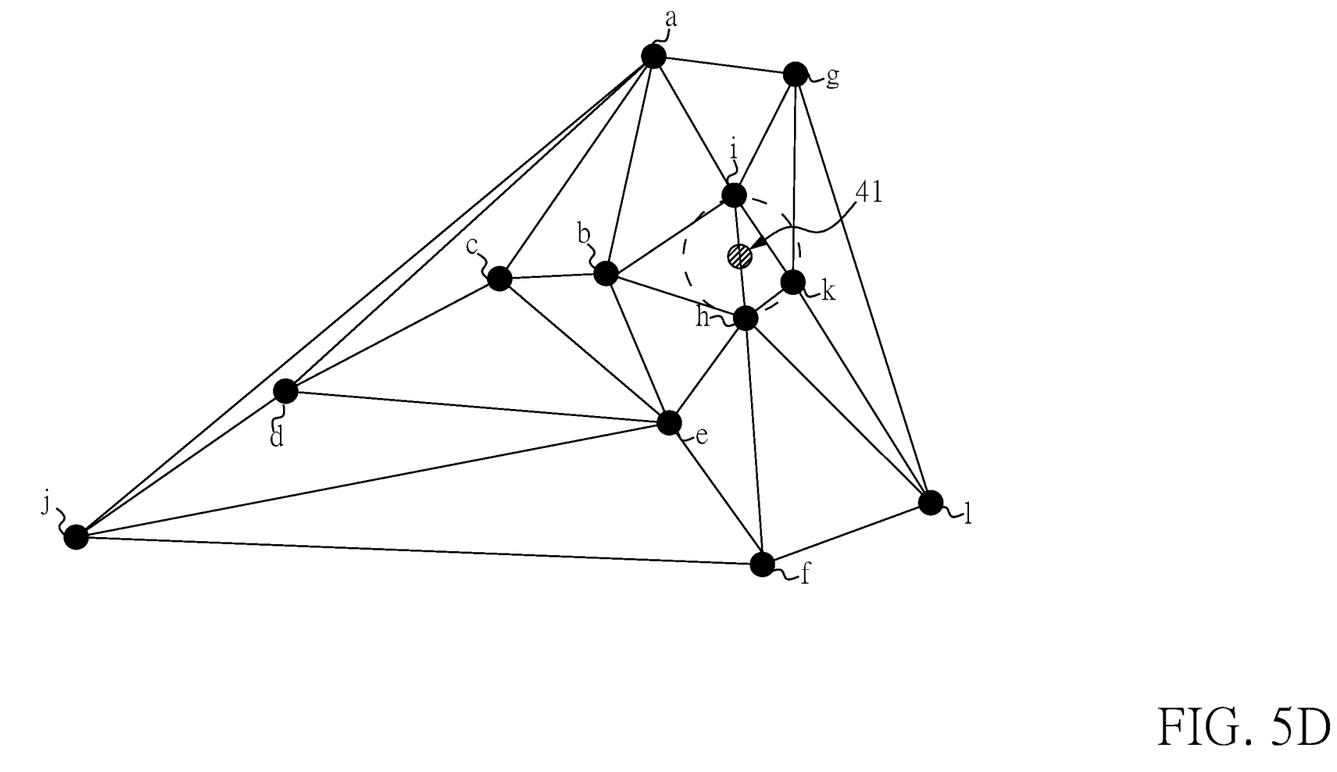
FIG. 5D is base to FIG. 4 to illustrate a schematic diagram of finding the smallest concentric circle according to the power positioning method of the present invention.

Hereafter, please refer to FIG. 5D is base to FIG. 4, to illustrate a schematic diagram of finding the smallest concentric circle according to the power positioning method of the present invention.

Finally, the calculation module 13 finds out the center of the smallest circumscribed circle in the triangle with the smallest circumscribed circle radius. The coordinate of the device to be measured 40 can be obtained by setting the center of the smallest circumscribed circle to be the device location 41 of the device to be measured 40. Taking FIG. 5D as an example, it can be obtained that the triangle formed by intersection i, h, k is the triangle with the smallest circumscribed circle radius. Therefore, the coordinate of the center of the circumscribed circle is the device location 41.

It should be noted here that the power positioning method of the present invention is not limited to the above order of steps. As long as the objective of the present invention can be achieved, the order of the above steps can also be changed.

With the power positioning method and power positioning device 1, the position of device to be measured 40 can be effectively found without too many additional sensing modules.

As described above, the objective, means, and efficiency of the present invention are all different from conventional characteristics in the prior art. It will be appreciated if the committee can review and grant a patent to benefit the society. However, it should be noted that the embodiments of the present invention described above are only illustrative. All without departing from the scope of the invention are defined solely by the appended claims.

What is claimed is:

1. A power positioning method, used for a power positioning device to find a device location of a device to be measured in a space, the space comprising a plurality of known location devices, the method comprising the following steps:
controlling the device to be measured to transmit a plurality of positioning signals by a plurality of transmission powers;
causing the plurality of known location devices to receive the plurality of positioning signals, and recording the plurality of positioning signal intensity, a plurality of corresponding receiving time and coordinates of the plurality of known location devices to a database;
finding out the known location device with a larger signal intensity among the received plurality of positioning signals;
taking out a signal intensity-distance function and a signal intensity-distance standard deviation function from the database;
finding out the plurality of known location devices with the larger signal intensity among different powers according to the signal intensity-distance function and the signal intensity-distance standard deviation function; and
grouping the plurality of known location devices according to a plurality of power to find out the device location of the device to be measured.

2. The power positioning method as claimed in claim 1, wherein the step of grouping the plurality of known location devices according to a plurality of power to find out the device location of the device to be measured groups comprises: grouping according to the plurality of power to set a plurality of the known location devices as a circle center, using the signal intensity and distance function to obtain a distance, and using the standard deviation obtained by distance deviation function to draw a plurality of circles;
obtaining a plurality of intersections between the plurality of circles;
performing a triangulation process on the plurality of intersections to obtain a plurality of triangles; and
finding out a triangle with the smallest circumscribed circle radius among the plurality of triangles to set the center of the circumscribed circle to be the device location of the device to be measured.

3. The power positioning method as claimed in claim 2, further comprising the step of finding out three known location devices with the larger signal intensity.

4. The power positioning method as claimed in claim 1, further comprising the step of finding out three known location devices with the larger signal intensity.

5. The power positioning method as claimed in claim 1, further comprising the step of receiving an identification code of the device to be measured.

6. The power positioning method as claimed in claim 1, further comprising a step of performing a data setting process, the data setting process comprising the steps of:
seating a plurality of transmission powers of a test transmitting device so that the test transmitting device transmits a plurality of test signals to a receiving device at a plurality of corresponding distance, wherein different test signals correspond to different transmission powers;
detecting intensities of the plurality of test signals received by the receiving device;
recording the intensities of the plurality of test signals and the plurality of corresponding distances to the database; and
calculating and storing the signal intensity-distance function and the signal intensity-distance standard deviation function to the database.

7. A power positioning device, used to find a device location of a device to be measured in a space, wherein the space further comprising a plurality of known location devices, the power positioning device comprising:
a processing module, which controls the device to be measured to transmit a plurality of positioning signals by a plurality of transmission powers, causing the plurality of known location devices to receive the plurality of positioning signals;
a database, which is electrically connected to the processing module for storing a signal intensity-distance function and a signal intensity-distance standard deviation function, and after the plurality of known location devices receive the plurality of positioning signals, the database records the plurality of positioning signal intensities, a plurality of corresponding receiving time, and coordinates of the plurality of known location devices, such that the processing module finds out the known location device with a larger signal intensity among the received plurality of positioning signals; and
a calculation module, which is electrically connected to the database for querying the signal intensity-distance function and the signal intensity-distance standard deviation function according to the plurality of positioning signal intensities, the plurality of corresponding receiving time and the known location device with a large intensity, to obtain a plurality of the known location devices with greater intensities at different powers, and then groups the plurality of known location devices according to a plurality of power to find out the device to be measured of the device location.

8. The power positioning device as claimed in claim 7, wherein the processing module groups the plurality of known location devices according to a plurality of power to sets the plurality of the known location devices as a circle center according to a plurality of power groups, uses the signal intensity and distance function to obtain a distance, uses the standard deviation of distance deviation function to draw a plurality of circles, and obtains a plurality of intersections between the plurality of circles, thereby the calculation module performs a triangulation process on the plurality of intersections to find out a center of the smallest circumscribed circle among the triangles with the smallest circumscribed circle radius, and sets it to be the device location of the device to be measured.

9. The power positioning, device as claimed in claim 8, wherein the processing module finds out three known location devices with the larger signal intensity.

10. The power positioning device as claimed in claim 7, wherein the processing module finds out three known location devices with the larger signal intensity.

11. The power positioning device as claimed in claim 7, comprising receiving an identification code of the device to be measured.

12. The power positioning device as claimed in claim 7, wherein the processing module sets a plurality of transmission powers of a test transmitting device to transmit a plurality of test signals, causing a receiving device to receive the plurality of test signals at a plurality of corresponding distances from the test transmitting device, wherein different test signals correspond to different transmission powers; thereby the processing module detects intensities of the plurality of test signals received by the receiving device to record the intensities of the plurality of test signals and the plurality of corresponding distances to the database, such that the calculation module can calculate and store the signal intensity-distance function and the signal intensity-distance standard deviation function to the database.

\* \* \* \* \*